(12) United States Patent
Okazaki et al.

(10) Patent No.: US 7,064,803 B2
(45) Date of Patent: Jun. 20, 2006

(54) LIQUID CRYSTAL DEVICE, METHOD FOR DRIVING THE SAME, AND ELECTRONIC APPARATUS

(75) Inventors: Tsuyoshi Okazaki, Suwa (JP); Tsuyoshi Maeda, Yamanashi (JP); Kinya Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 78 days.

(21) Appl. No.: 10/765,058

(22) Filed: Jan. 28, 2004

(65) Prior Publication Data

US 2004/0227881 A1 Nov. 18, 2004

(30) Foreign Application Priority Data

Mar. 5, 2003 (JP) .............................. 2003-058744

(51) Int. Cl.
*G02F 1/1337* (2006.01)
*G02F 1/1343* (2006.01)
*G02F 1/13* (2006.01)

(52) U.S. Cl. ...................... 349/178; 349/129; 349/143; 349/144

(58) Field of Classification Search ................ 349/129, 349/143, 144, 178
See application file for complete search history.

(56) References Cited

U.S. PATENT DOCUMENTS

| | | | |
|---|---|---|---|
| 5,608,556 A * | 3/1997 | Koma | 349/143 |
| 6,040,885 A * | 3/2000 | Koike et al. | 349/129 |
| 6,256,082 B1 * | 7/2001 | Suzuki et al. | 349/144 |
| 6,466,293 B1 | 10/2002 | Suzuki et al. | |
| 6,597,423 B1 | 7/2003 | Oima et al. | |
| 2003/0048401 A1 | 3/2003 | Hanaoka et al. | |
| 2005/0146664 A1 | 7/2005 | Hanaoka et al. | |

FOREIGN PATENT DOCUMENTS

| | | |
|---|---|---|
| JP | A 07-199190 | 8/1995 |
| JP | A 11-139393 | 4/1999 |
| JP | A 11-212053 | 8/1999 |
| JP | A 2000-267122 | 9/2000 |
| JP | A 2001-042347 | 2/2001 |
| JP | A 2002-333636 | 11/2002 |
| JP | 2002-350902 | 12/2002 |
| JP | A 2002-357830 | 12/2002 |

* cited by examiner

*Primary Examiner*—Huyen Ngo
(74) *Attorney, Agent, or Firm*—Oliff & Berridge, PLC

(57) ABSTRACT

To provide a liquid crystal device in which the occurrence of disclination is efficiently suppressed in a dot area, thereby allowing a bright display and the alignment control of the liquid crystal molecules can be carried out by applying low voltage, a liquid crystal device includes: an array substrate having pixel electrodes arranged in a matrix and switching elements corresponding to the respective pixel electrodes formed on a surfaces of the array substrate, a counter substrate opposing the array substrate, a liquid crystal layer including negative dielectric anisotropy liquid crystal disposed between the array substrate and the counter substrate, and stripe alignment control electrodes disposed on the liquid crystal layer facing surface of the counter substrate, each alignment control electrode extending along the boundaries of the pixel electrodes in plan view.

14 Claims, 8 Drawing Sheets

F I G. 1
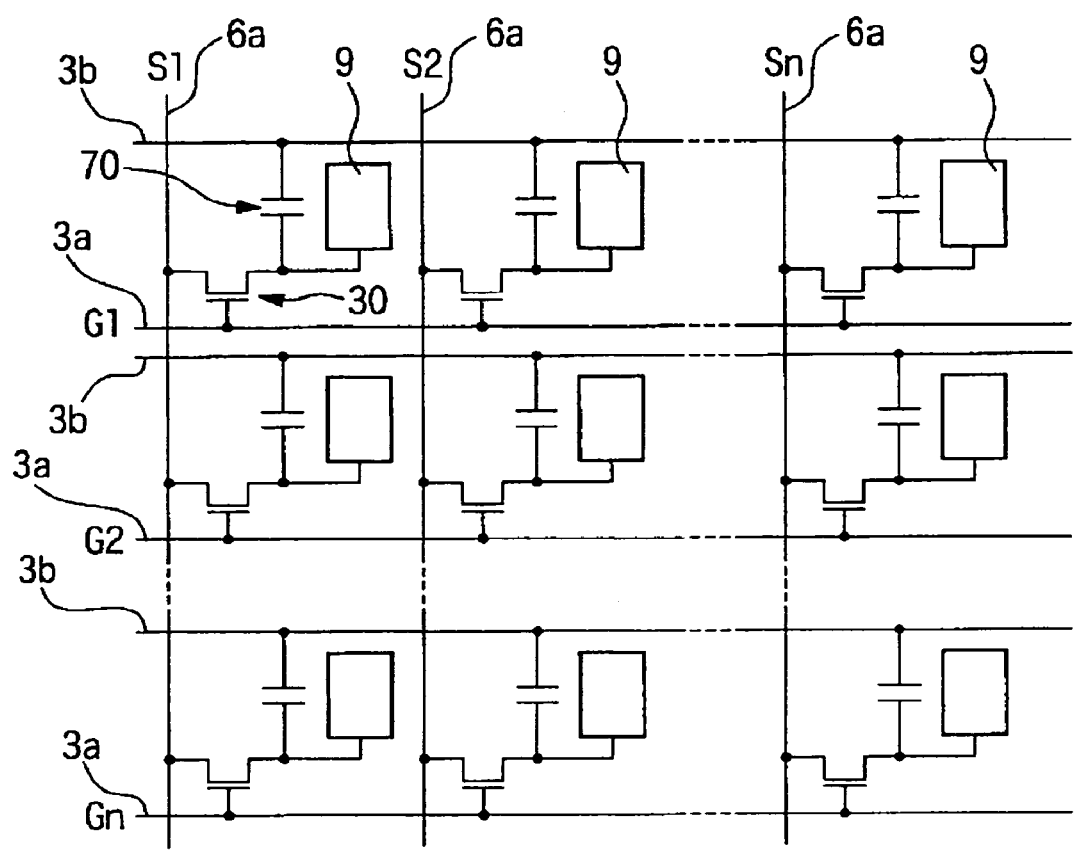

F I G. 9
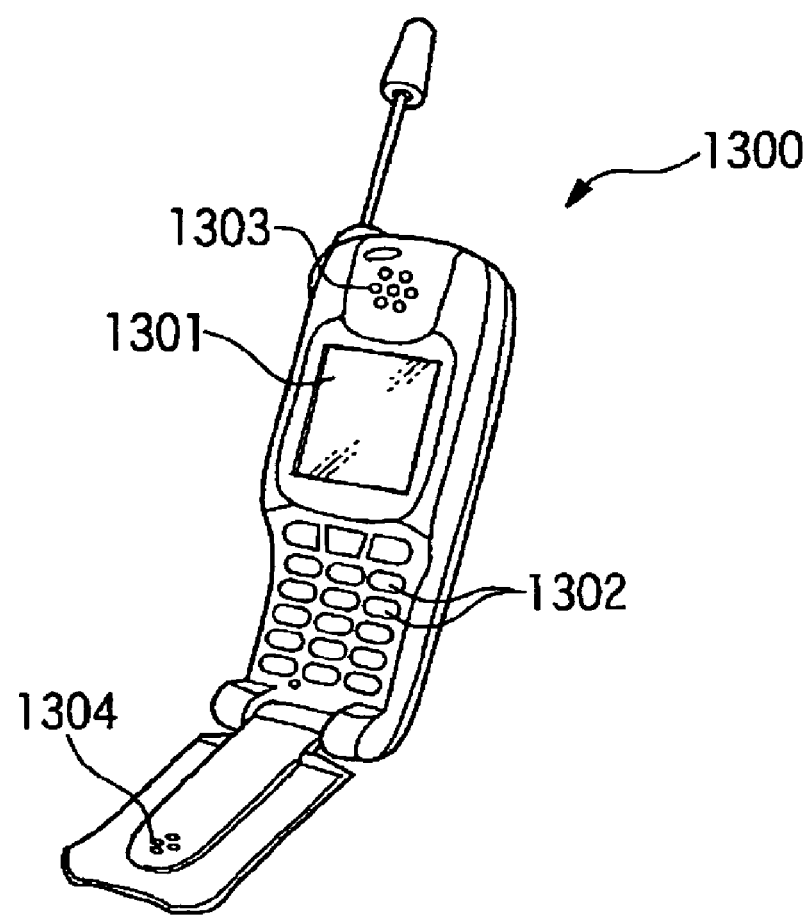

LIQUID CRYSTAL DEVICE, METHOD FOR DRIVING THE SAME, AND ELECTRONIC APPARATUS

BACKGROUND OF THE INVENTION

1. Field of Invention

The present invention relates to a liquid crystal device, a driving method of the liquid crystal device, and an electronic apparatus.

2. Description of Related Art

There are two types of liquid crystal alignment modes: a twisted nematic (hereinafter referred to as TN) mode, in which the liquid crystal molecules are, in the voltage OFF state, aligned substantially parallel to a substrate and twisted towards a direction perpendicular to the substrate, and a vertical, or homeotropic alignment mode, in which the liquid crystal molecules are vertically aligned. The TN mode has been used in the related art because of high reliability; however, much attention has been recently focused on liquid crystal devices using the homeotropic alignment mode due to several excellent characteristics.

For example, in the homeotropic alignment mode, the state where the liquid crystal molecules are perpendicularly aligned relative to the substrate, that is, no optical retardation exists from the normal direction of the substrate, is used as a black display state. As a result, high quality black display and high contrast are obtained. In addition, since liquid crystal display devices operated in the homeotropic alignment mode have better contrast characteristics from the front view, the range of viewing angles with a constant contrast becomes wider compared to TN liquid crystal displays, which are operated in a homogeneous alignment mode.

Unfortunately, in the homeotropic alignment mode, the tilt direction of the liquid crystal must be appropriately controlled. Otherwise, disclination, which is a region where the liquid crystal molecules do not fall, occurs in the center of the dot area, thus disadvantageously decreasing brightness of the display. Additionally, the liquid crystal molecules fallen radially about the disclination change the angle of the director of the liquid crystal molecules with respect to the polarizer in the dot areas, so that the amount of light passing through the polarizer is disadvantageously decreased.

To overcome these disadvantages of the liquid crystal display in the homeotropic alignment mode, Japanese Unexamined Patent Application Publication No. 11-212053 indicated below, for example, discloses a liquid crystal display device that controls the tilt direction of the liquid crystal molecules in the voltage ON state by mounting embedded electrodes to control the alignment in the boundary areas of pixel electrodes, which are arranged on a substrate in a matrix in plan view.

According to the liquid crystal display device disclosed in the above-described Japanese Unexamined Patent Application Publication No. 11-212053, the embedded electrodes, which are controlled independently from the voltages applied to pixel electrodes, can control a tilt direction of liquid crystal molecules in dot areas when voltage is applied. However, since the embedded electrodes are disposed between pixel electrodes and substrates, the embedded electrodes must generate a stronger electric field than that generated by the pixel electrodes to appropriately control the direction. That is, a higher voltage must be applied to the embedded electrodes than to the pixel electrodes and so the driving circuit of the embedded electrodes must have a high withstanding voltage. Consequently, the complicated structure and the required high quality of the circuit disadvantageously make the fabrication difficult and costly.

SUMMARY OF THE INVENTION

Accordingly, the present invention provides a liquid crystal device in which the disclination is efficiently suppressed in dot areas so as to obtain a bright display and in which alignment control of the liquid crystal molecules can be at a low voltage, and preferably a liquid crystal device having ease of fabrication.

The present invention also provides a driving method suitable for the above-described liquid crystal device.

To address the above-mentioned problem, a liquid crystal device according to an aspect of the present invention includes: an array substrate having pixel electrodes arranged in a matrix and switching elements corresponding to the respective pixel electrodes formed on a surface of the array substrate, a counter substrate opposing the array substrate, a liquid crystal layer including negative dielectric anisotropy liquid crystal disposed between the array substrate and the counter substrate, and stripe alignment control electrodes disposed between the counter substrate and the liquid crystal layer, each alignment control electrode extending along the boundaries of the pixel electrodes in plan view.

In this structure, since alignment control electrodes are disposed along the boundaries of the pixel electrodes in a matrix in plan view, the liquid crystal molecules in the liquid crystal layer in a homeotropic alignment mode can be tilted to align in the arrangement direction of the alignment control electrodes when voltage is applied to the pixel electrodes. Accordingly, disclination caused by random tilting of the liquid crystal molecules is efficiently reduced or prevented, thus allowing a bright display.

Since the alignment control electrodes are disposed on the counter substrate instead of the array substrate, electric fields generated by the alignment control electrodes to control the tilt direction of the liquid crystal molecules are not shielded by electric fields generated by the pixel electrodes, and thus directly act on the liquid crystal layer. Accordingly, compared to a related art liquid crystal display device disclosed in Japanese Unexamined Patent Application Publication No. 11-212053, the voltage applied to the alignment control electrodes can be decreased, thereby eliminating a circuit design to increase the withstanding voltage for driving the alignment control electrodes, and thus allowing for ease of the fabrication and low cost fabrication.

In the liquid crystal device according to an aspect of the present invention, preferably the voltages applied to two adjacent alignment control electrodes have reverse polarities. The definition of the "reverse polarities", in this context, is as follows: if the potential of electrodes on the counter substrate side is a reference (zero), one potential is positive and the other potential is negative with respect to the reference. For example, if the potential of the electrodes on the counter substrate side is 0 V, one polarity is negative potential and the other polarity is positive potential. This structure aligns the tilt directions of the liquid crystal molecules when voltages are applied, namely, the direction of director, in the dot areas, and thus reduces or prevents the brightness from being decreased due to the occurrence of disclination lines in the dot areas.

In the liquid crystal device according to an aspect of the present invention, the voltages applied to the alignment control electrodes may be lower than the maximum driving voltage of the pixel electrodes. Since, like the above-described structure, the alignment control electrodes are disposed on the counter substrate side, the electric fields generated by the alignment control electrodes substantially directly act on the liquid crystal layer. Accordingly, even if the voltages applied to the alignment control electrodes is lower than the maximum driving voltage of the pixel electrodes, that is, the maximum voltage applied to the pixel electrodes while displaying images, the tilt directions of the liquid crystal molecules can be appropriately controlled. This structure allows the voltage as low as that of a related art liquid crystal device to drive the pixel electrodes and the alignment control electrodes, thus facilitating the transition from a related art structure to this structure.

In the liquid crystal device according to an aspect of the present invention, mutually orthogonal scanning lines and data lines may extend along the edges of the pixel electrodes, the liquid crystal device may be driven by a Row inversion mode, and the alignment control electrodes may substantially overlap the scanning lines in plan view.

Alternatively, the mutually orthogonal scanning lines and data lines may extend along the edges of the pixel electrodes, the liquid crystal device may be driven by a Column inversion mode, and the alignment control electrodes may substantially overlap the data lines in plan view.

Preferably, in the liquid crystal device according to an aspect of the present invention, the driving voltages of the reverse polarities are applied to the adjacent pixels in the arrangement direction of the alignment control electrodes. This is because the tilt directions of the liquid crystal molecules are aligned in the same direction at the front of a panel. Accordingly, in the case where the alignment control electrodes are disposed along the scanning lines, the pixel electrodes are preferably driven by a Row inversion mode. In the case where the alignment control electrodes are disposed along the data lines, the pixel electrodes are preferably driven by a Column inversion mode.

The liquid crystal device according to an aspect of the present invention may include a common electrode formed over the entire liquid-crystal-layer facing surface of the counter substrate, the alignment control electrodes being formed between the common electrode and the liquid crystal layer with an insulating layer between the common electrode and the alignment control electrodes. This structure allows the alignment control electrodes that are electrically insulated from the common electrodes and can hold predetermined potentials to be disposed on the counter substrate.

The liquid crystal device according to an aspect of the present invention may include common electrodes formed substantially in a stripe pattern between the counter substrate and the liquid crystal layer, the alignment control electrodes being formed between the common electrodes and the counter substrate with an insulating layer between the alignment control electrodes and the common electrodes and extending along gaps between the pixel electrodes in plan view.

This structure allows appropriate alignment control of the liquid crystal layer even if the alignment control electrodes are positioned nearer to the counter substrate than the common electrodes. Accordingly, the structure facilitates, for example, the alignment control electrodes functioning as parts of the light shielding films on the counter substrate or as parts of black matrices of color filters.

The liquid crystal device according to an aspect of the present invention may include common electrodes formed substantially in a stripe pattern between the counter substrate and the liquid crystal layer, the alignment control electrodes being formed in the gaps of the common electrodes and extending parallel to the common electrodes.

This structure allows the common electrodes and the alignment control electrodes to be formed in the same layer. In particular, in the case where the common electrodes and the alignment control electrodes are made from the same material, this structure advantageously decreases the fabrication steps. In addition, this structure advantageously eliminates the fabrication step to form an insulating layer that electrically insulates the common electrodes from the alignment control electrodes.

In the liquid crystal device according to an aspect of the present invention, the alignment control electrodes may function as light shielding films or parts of light shielding films. In the areas where the alignment control electrodes are formed, their electric fields distort electric fields in the liquid crystal layer and the areas become disclination areas. Therefore, the areas must be shaded not to decrease the display quality. This structure allows the alignment control electrodes themselves to shade the above-described disclination areas. That is, when the light shielding films are formed to shade the above-described disclination areas separately from the alignment control electrodes, the positioning of the light shielding films and the alignment control electrodes is required. This structure eliminates the positioning step, thus efficiently simplifying the fabrication.

The liquid crystal device according to an aspect of the present invention may include color filters formed between the alignment control electrodes and the counter substrate. This structure can provide a liquid crystal device having a bright color display over a wide viewing angle range. Preferably, the alignment control electrodes are disposed inside the planar areas of the above-described black matrix. If the alignment control electrodes extend past the areas of the black matrix, the exceeded areas must also be shaded, thereby undesirably decreasing the aperture ratio.

The liquid crystal device according to an aspect of the present invention may include a circularly polarized light incident device disposed on both sides of the liquid crystal layer to enable circularly polarized light to enter the liquid crystal layer. This structure eliminates the decrease of the brightness caused by the difference in the angles between the transmission axis of the polarizers and the director of the liquid crystal molecules in the liquid crystal layer, thus providing a bright display.

In a method of driving the above-described liquid crystal device according to an aspect of the present invention, the pixel electrodes are driven with voltages of reverse polarities applied to the adjacent alignment control electrodes. This driving method can drive the liquid crystal device so that the directors of the liquid crystal molecules are aligned substantially in the same direction in the dot area (in the arrangement direction of the alignment control electrodes) when voltages are applied to the pixel electrodes, thus providing a bright display.

In the method of driving the liquid crystal device according to an aspect of the present invention, the voltages may be applied to the alignment control electrodes in synchronization with the scanning of the pixel electrodes. This structure can also provide the bright display.

An electronic apparatus according to an aspect of the present invention includes the above-described liquid crystal device according to an aspect of the present invention. This structure can provide electronic apparatuses having display units with high brightness, high contrast, and wide viewing angle or with optical modulation means.

BRIEF DESCRIPTION OF THE DRAWINGS

FIG. 1 is a schematic of an equivalent circuit of a liquid crystal device according to a first exemplary embodiment of the present invention;

FIG. 9 is a perspective view of an example of the electronic apparatuses according to an aspect of the present invention.

DETAILED DESCRIPTION OF PREFERRED EXEMPLARY EMBODIMENTS

Exemplary embodiments of the present invention will now be described with reference to the accompanying figures. A liquid crystal device in the following exemplary embodiment is an active matrix liquid crystal device having TFTs (Thin Film Transistors) as switching elements.

First Exemplary Embodiment

Figure 2:
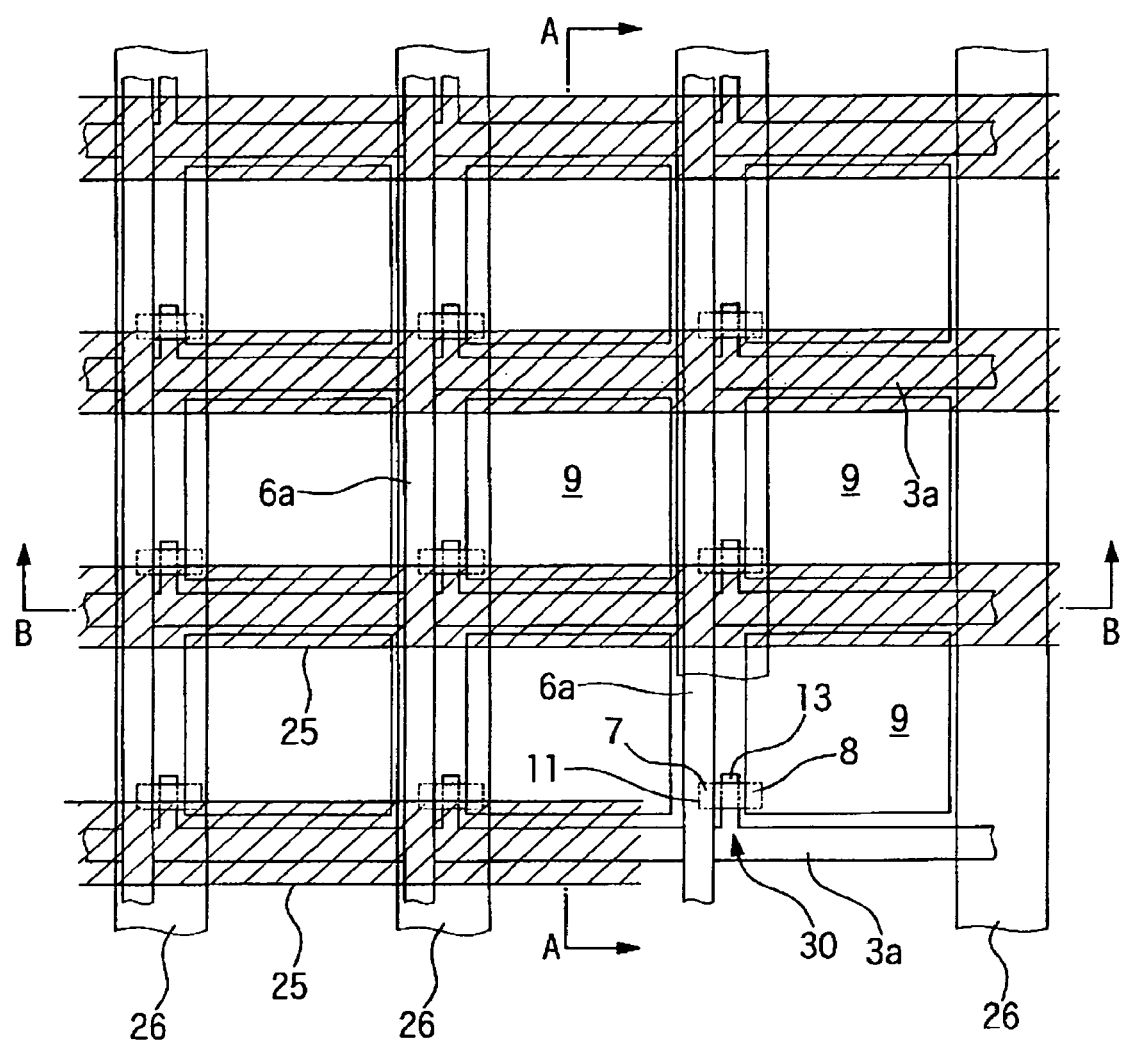
FIG. 2 is a plan view showing the structure of one dot of the liquid crystal device.
Figure 3A:
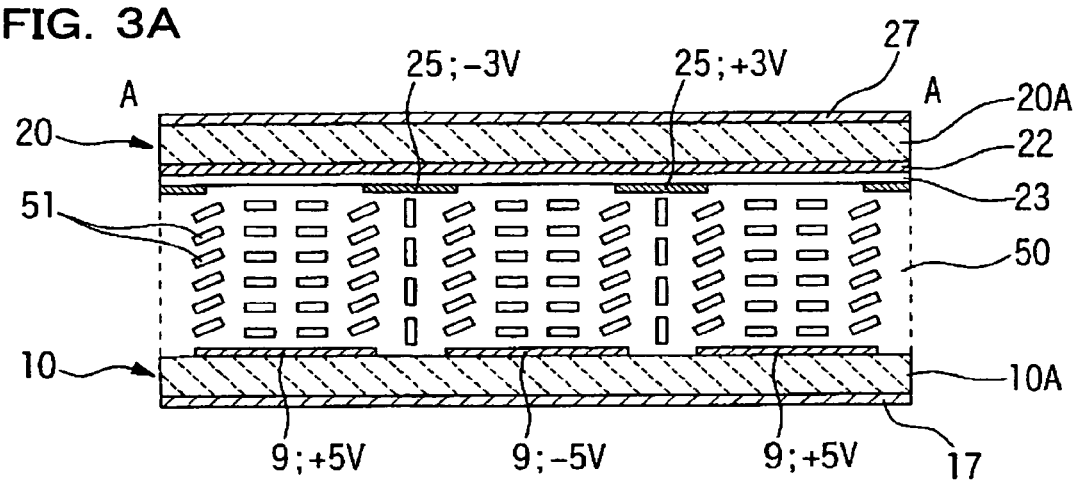
FIG. 3(A) is a partial cross-sectional view along plane A—A in FIG. 2.
Figure 3B:
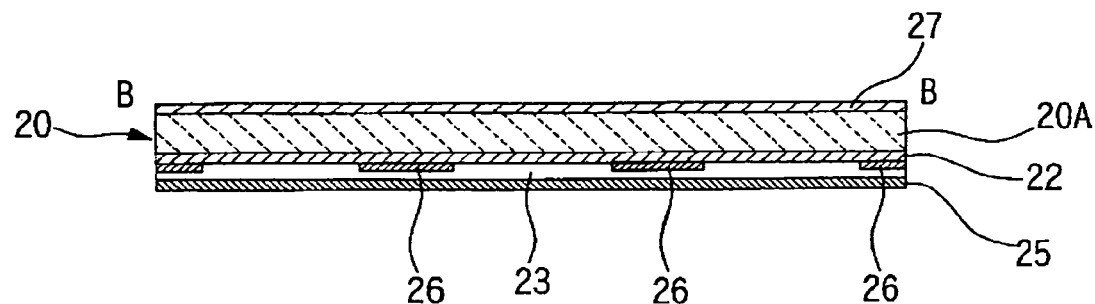
FIG. 3(B) is a partial cross-sectional view of the liquid crystal device along plane B—B in FIG. 2.

FIG. 1 is a schematic of an equivalent circuit of a plurality of dots arranged in a matrix, which constitute an image display area of a liquid crystal device according to an exemplary embodiment of the present invention. FIG. 2 is a plan view showing the structure of one dot on a TFT array substrate. FIGS. 3(A) and 3(B) are cross-sectional views showing the structure of the liquid crystal display device according to an exemplary embodiment of the present invention. FIG. 3(A) is a partial cross-sectional view along plane A—A in FIG. 2. FIG. 3(B) is a partial cross-sectional view of a counter substrate along plane B—B in FIG. 2. In the figures, the scales of the layers and the other elements are appropriately altered from the actual ones for enabling them to be easily viewed.

Referring to FIG. 1, in a liquid crystal device according to an exemplary embodiment of the present invention, pixel electrodes 9 and TFTs 30, which are switching elements controlling the corresponding pixel electrodes 9, are formed in a plurality of dots, which are arranged in a matrix to constitute an image display area. Data lines 6a for supplying image signals are electrically connected to the sources of the corresponding TFTs 30. The image signals S1, S2, . . . , Sn written into the data lines 6 are supplied to the respective lines in this order in a line-sequential manner or are supplied to each of line groups which consist of the adjacent data lines 6a. Scanning lines 3a are electrically connected to the gates of the TFTs 30. Pulsed scanning signals G1, G2, . . . , Gm are applied to the scanning lines 3a in a line-sequential manner at a predetermined timing. The pixel electrodes 9 are electrically connected to the drains of the TFTs 30, which write the image signals S1, S2, . . . , Sn supplied from the data lines 6a at a predetermined timing by turning on the switching element TFTs 30 for a predetermined period of time.

The image signals S1, S2, . . . , Sn having a predetermined voltage level written in liquid crystal via the pixel electrodes 9 are retained between the pixel electrodes 9 and common electrodes, which are described hereinafter, for a predetermined period of time. The liquid crystal changes the alignment or orientation of the molecules depending on the applied voltage level, thereby modulating light and so enabling grayshade. Herein, to reduce or prevent leakage of the retained image signals, storage capacitors 70 are disposed in parallel to the liquid crystal capacitors between the pixel electrodes 9 and the common electrodes. Reference numerals 3b denote capacitor lines.

A planar structure of the liquid crystal device according to an exemplary embodiment will now be described with reference to FIG. 2. These rectangular pixel electrodes 9 are mounted on a TFT array substrate in a matrix as shown in FIG. 2. The data lines 6a and the scanning lines 3a extend along the vertical and horizontal boundaries of the pixel electrodes 9. In FIG. 2, the capacitor lines 3b and the storage capacitors 70 are not shown for the sake of simplifying the figure. In this exemplary embodiment, an area where the data lines 6a and the scanning lines 3a surround each of the pixel electrodes 9 corresponds to one dot area, and the dot areas arranged in a matrix can independently display an image.

The data lines 6a intersect with rectangular semiconductor layers 11, which are parts of the TFTs 30 and made of, for example, polysilicon. At the intersections, the data lines 6a are electrically connected to source regions 7 of the semiconductor layers 11 via contact holes (not shown). The pixel electrodes 9 are electrically connected to drain regions 8 of the semiconductor layers 11 directly or via contact holes. Gate electrodes 13, which branch from the scanning lines 3a, intersect substantially with the centers of the semiconductor layers 11. The areas of the semiconductor layers 11 where the gate electrodes 13 overlap in plan view are the channel regions of the semiconductor layers 11.

Stripe alignment control electrodes 25 are disposed such that they overlap the scanning lines 3a in plan view. Stripe light shielding films 26 are disposed substantially orthogonally to the alignment control electrodes 25. The alignment control electrodes 25 are wider than the scanning lines 3a and overlap the parts of the pixel electrodes 9 near the scanning lines 3a in plan view. The light shielding films 26 are formed such that they cover the data lines 6a and the parts of the semiconductor layers 11. The alignment control electrodes 25 and the light shielding films 26 are disposed on the liquid crystal layer facing surface of a counter substrate, which opposes the TFT array substrate having the pixel electrodes 9 and the TFTs 30 thereon. The counter substrate is described below.

With reference to FIG. 3(A) illustrating the sectional view, a liquid crystal layer 50 initially having a homeotropic alignment and made from liquid crystal having negative dielectric anisotropy is disposed between the TFT array substrate 10 and a counter substrate 20 opposing the TFT array substrate 10. The TFT array substrate 10 has the pixel electrodes 9 on a surface of a substrate body 10A made from a transparent material, such as quartz or glass. The pixel electrodes 9 are composed of a transparent conductive film made from ITO, a metal reflective film made from aluminum or silver, or a laminated film of the above-described transparent conductive film and the metal reflective film.

In FIG. 3(A), only the substrate body 10A and the pixel electrodes 9 are shown as components of the TFT array substrate 10. Actually, one or more insulating films are formed between the pixel electrodes 9 and the substrate body 10A, and the above-described semiconductor layers 11, the scanning lines 3a, and the data lines 6a are formed between the insulating films. A homeotropic alignment layer is formed to cover the pixel electrodes 9.

On the other hand, with reference to FIGS. 3(A) and 3(B), common electrodes 22, light shielding films 26 substantially in a stripe pattern in plan view, an insulating film 23 covering the light shielding films 26, and the alignment control electrodes 25, which extend orthogonally to the light shielding films 26, are formed, in this order, on the inner surface of a substrate body 20A made from a transparent material, such as quartz or glass. A homeotropic alignment layer (not shown) is formed to cover the alignment control electrodes 25 and the insulating film 23.

As shown in FIG. 3(A), polarizers 17 and 27 are disposed on the outer surfaces of the TFT array substrate 10 and the counter substrate 20, respectively.

The common electrode 22 on the counter substrate 20 is made from a transparent conductive material, for example, ITO and is formed over the entire surface of the substrate body 20A. The light shielding films 26 formed on the common electrode 22 are made from, for example, Al or Cr. The insulating film 23, which covers the light shielding films 26 and the common electrode 22, is made from an insulating transparent material, for example, $SiO_2$ and electrically insulates the alignment control electrodes 25 from the common electrode 22 so that a desired voltage can be applied to the alignment control electrodes 25. Accordingly, in this exemplary embodiment, driving circuits to apply voltage to the alignment control electrodes 25 are connected at the ends of the extending alignment control electrodes 25.

In the liquid crystal device according to the exemplary embodiment, when the liquid crystal molecules fall towards the surface of the substrate by voltage being applied to the liquid crystal in the homeotropic alignment mode, the alignment control electrodes 25 on the counter substrate 20 enable the liquid crystal to be tilted in the widthwise direction (the arrangement direction) of the alignment control electrodes 25. FIG. 3(A) is a schematic view showing the alignment state of liquid crystal molecules 51 when voltages of +5 V, −5 V, and +5 V are applied to the pixel electrodes 9 (from the left in the figure) and voltages of −3 V and +3 V are alternately applied to the alignment control electrodes 25 on the counter substrate (from the left in the figure). The alignment state of the liquid crystal molecules 51 shown in the figure is based on the inventor's simulation under the electrode potential conditions shown in FIG. 3(A).

In this simulation, the driving method of the liquid crystal device is a Row inversion mode (line inversion). Retardation of the liquid crystal layer 50 is λ/2 in the voltage ON state. The polarizers 17 and 27 become crossed nicols and normally black where the light transmission axis is tilted to the extending direction of the alignment control electrodes 25 by 45°. Voltages of +3 V and −3 V are alternately applied to the series of alignment control electrodes 25.

With reference to FIG. 3(A), in the liquid crystal device according to the exemplary embodiment, applying a lower voltage (3 V) than the driving voltage of the pixel electrodes 9 (5 V) to the alignment control electrodes 25 allows the tilt directions (director) of the liquid crystal molecules 51 to be aligned towards the right in the figure in the dot areas when voltages are applied to the liquid crystal layer 50. That is, voltages applied to the alignment control electrodes 25 distort electric fields generated between the pixel electrodes 9 and the common electrode 22 near the alignment control electrodes 25, thus causing the tilt of the electric fields near the edges of the pixel electrodes 9. Then, some of the liquid crystal molecules 51 fall along the tilt of the electric fields, so that the other liquid crystal molecules 51 in the dot areas follow to fall towards one direction. Since the distortion by the alignment control electrodes 25 occurs only in the vicinity of the alignment control electrodes 25, the distortion does not affect the display areas, although it depends on the width of the alignment control electrodes 25. Accordingly, even if the liquid crystal molecules 51 fall at small angles due to the electric fields of the alignment control electrodes 25, degradation of the display, such as a blackening phenomenon, does not occur.

Thus, the liquid crystal device according to the exemplary embodiment efficiently reduces or prevents the disclination line by the liquid crystal molecules 51 falling disorderly in the dot areas, thus providing a bright display. In addition, pigmented spot from a perspective view direction, which is a common disadvantage of liquid crystal devices in a homeotropic alignment mode, is efficiently reduced or prevented, thereby providing a high quality display over a wide viewing angle range.

Additionally, in this exemplary embodiment, the alignment control electrodes 25 are composed of a metal film, such as Al or Cr, and function as light shielding films (a black matrix). The alignment control electrodes 25 may be made from a transparent conductive material, such as ITO; however, if they function as the light shielding films, as described above, the areas where the electric fields are distorted by the voltage of the alignment control electrodes 25 are easily shaded so that the disclination caused by the distortion of the electric fields does not impair the display quality. In addition, in the case where the alignment control electrodes 25 are transparent and other light shielding films are mounted, the alignment control electrodes 25 and the light shielding films must be precisely aligned to each other. The structure in which the alignment control electrodes 25 function as the light shielding films decreases the fabrication steps and the yield loss due to defective accuracy.

In the planar areas of the alignment control electrodes 25, the above-described distortion of electric fields occurs and so the disclination occurs. For aperture rate of the liquid crystal device, the width of the alignment control electrodes 25 is preferably decreased to the interval of the pixel electrodes 9. In the case where other light shielding films are mounted along the alignment control electrodes 25, the width may be further decreased.

As described above, in the liquid crystal device according to the exemplary embodiment, the alignment control electrodes 25 are mounted on the counter substrate 20 side. Therefore, the voltage applied to the alignment control electrodes 25 which control tilt directions of liquid crystal molecules in the voltage ON state may be lower than the voltage applied to the pixel electrodes 9. In particular, in the related art technology disclosed in Japanese Unexamined Patent Application Publication No. 11-212053, the embedded electrodes to control the alignment are mounted at the lower position than pixel electrodes. If the driving voltage of the pixel electrodes is, for example, 5 V, the voltage applied to the embedded electrodes must be in the range of about 10 to 15 V, which is much higher than the voltage applied to the pixel electrodes. Accordingly, a circuit having high withstanding voltage is required for the driving circuit of the embedded electrodes. On the other hand, in the liquid crystal device according to the exemplary embodiment, even if the voltage applied to the alignment control electrodes 25 is lower than the voltage applied to the pixel electrodes 9, the alignment control electrodes 25 can appropriately control tilt directions of liquid crystal molecules, as described above. As a result, the load to the driving circuit for the alignment control electrodes 25 is decreased, thereby eliminating a circuit having high withstanding voltage, and thus providing ease of the fabrication.

Figure 4:
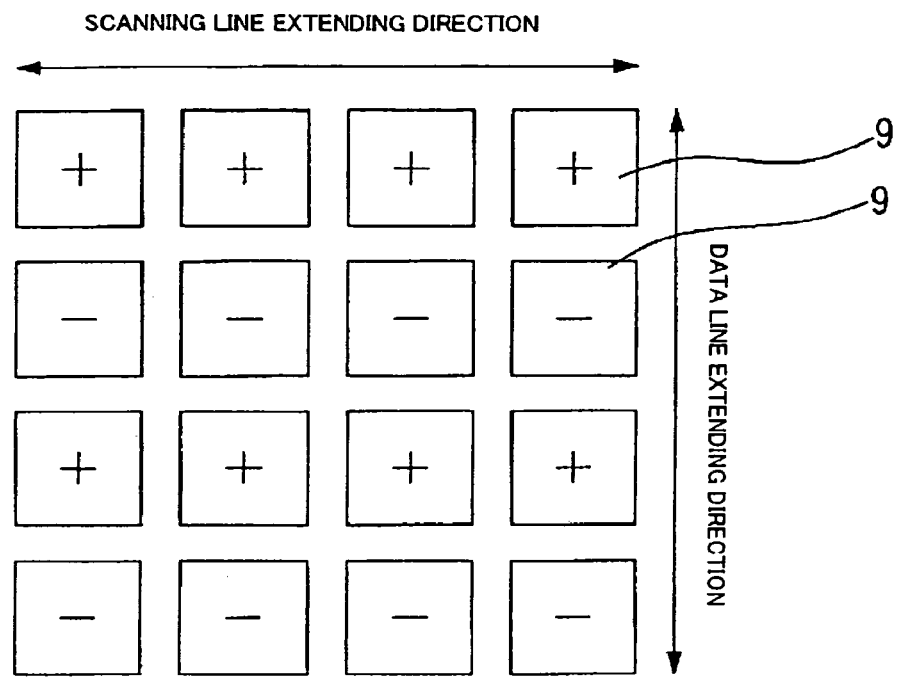
FIG. 4 is an explanatory view illustrating the polarities of the voltages of the pixels in a Row inversion mode.
Figure 5:
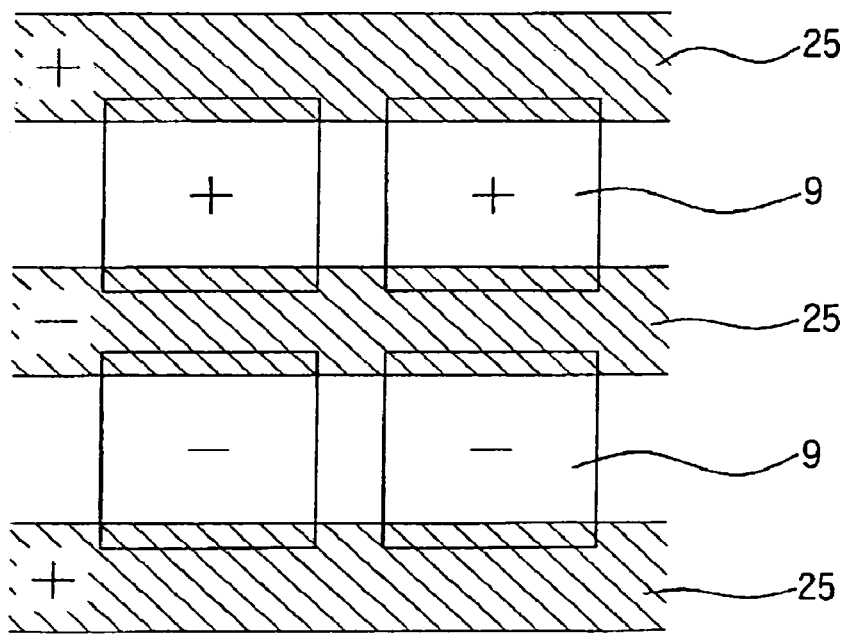
FIG. 5 is an explanatory view illustrating the polarities of the voltages in the liquid crystal device according to an aspect of the present invention in an operating state.

In the liquid crystal device according to the exemplary embodiment, the polarities of the voltages applied to the respective alignment control electrodes 25 are alternated and a 1H reverse driving method is employed. FIG. 4 is a schematic explanatory view illustrating the polarities of the voltages of the pixels in the case where the potential of the common electrode is 0 V and the Row inversion mode is employed. FIG. 5 is a schematic explanatory view illustrating the polarities of the voltages of the pixel electrodes 9 and the alignment control electrodes 25.

In the liquid crystal device according to the exemplary embodiment, as shown in FIG. 2, the alignment control electrodes 25 are disposed parallel to the extending direction of the scanning lines, and as shown in FIG. 5, the voltages of reverse polarities are applied to the respective alignment control electrodes 25. In this structure, the Row inversion mode is preferable, in which the voltages of the reverse polarities are applied to the adjacent pixels in the arrangement direction of the alignment control electrodes 25. Other than this method, for example, an S reverse driving method is not preferable, since the grayscale is displayed as rough pigmented spots.

Accordingly, in the 1H reverse driving method, with reference to FIG. 4, the image signals are written into the pixel electrodes 9 such that the pixels in the same scanning lines have the same polarities of the voltages, the adjacent pixels in the data lines have the alternated polarities of the voltages, and the polarities of the voltages of the pixels are alternated every one frame. As a result, the polarities of the voltages are alternated in the arrangement direction of the alignment control electrodes 25, thus eliminating flickers and providing an excellent display.

For example, two driving methods for the alignment control electrodes 25 may be employed: (1) a constant voltage is always applied to the alignment control electrodes 25, and (2) the alignment control electrodes 25 are scanned in synchronization with the scanning of the scanning lines 3a. Both methods advantageously provide increased brightness by suppressing the occurrence of the disclination. Therefore, either method can be selected to suppress flickers in accordance with the design of the liquid crystal device.

In the liquid crystal device according to an exemplary embodiment, a circularly polarized light incident device, such as ¼ wavelength plates, may be disposed between the polarizer 17 and the liquid crystal layer 50 and between the polarizer 27 and the liquid crystal layer 50 shown in FIG. 3(A). In this structure, light passing through the liquid crystal layer 50 is circularly polarized so that the brightness of the liquid crystal device does not depend on the angles of the director of the liquid crystal molecules relative to the transmission and absorption axes of the polarizers 17 and 27.

Figure 6:
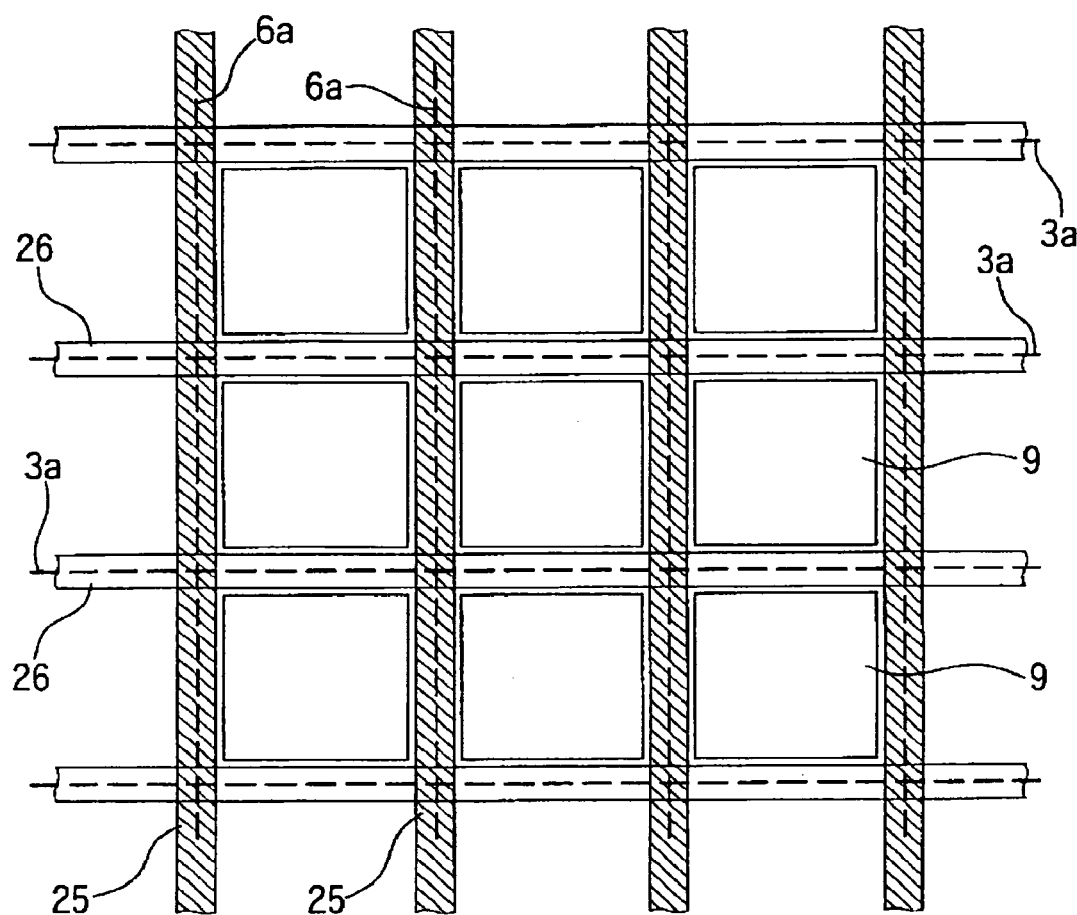
FIG. 6 is a plan view of another structure of the liquid crystal device according to the first exemplary embodiment.

In the above-described exemplary embodiment, the alignment control electrodes 25 are disposed along the scanning lines 3a. According to an aspect of the present invention, with reference to FIG. 6, the alignment control electrodes 25 may be disposed along the data lines 6a. FIG. 6 is a plan view of another structure of the liquid crystal device according to the first exemplary embodiment. The sectional view is the same as that of the first exemplary embodiment shown in FIG. 3.

In this structure, the light shielding films 26 are disposed on the counter substrate 20 along the scanning lines 3a. The Column inversion mode is employed for the liquid crystal device according to the exemplary embodiment. That is, the pixels are driven such that the adjacent pixels in the arrangement direction of the alignment control electrodes 25 (the transverse direction in the drawing), which are formed along the data lines 6a, have the voltages of the reverse polarities.

As in the former exemplary embodiments, in the liquid crystal device shown in FIG. 6, the liquid crystal molecules in the dot areas fall and align in one direction when voltage is applied. Accordingly, the occurrence of the disclination is suppressed and a bright display is provided. Of course, a circularly polarized device may be disposed above and under the liquid crystal layer.

Second Exemplary Embodiment

Figure 7A:
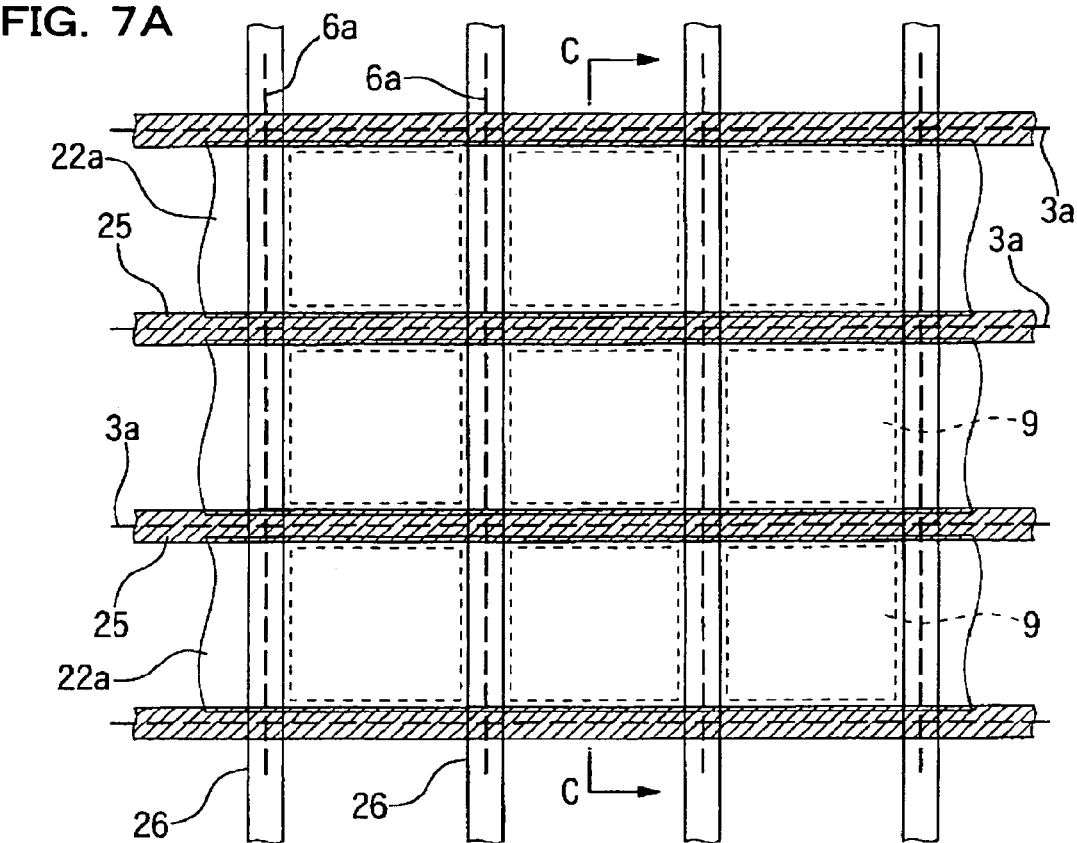
FIG. 7(A) is a plan view showing a structure of a liquid crystal device according to a second exemplary embodiment of the present invention.
Figure 7B:
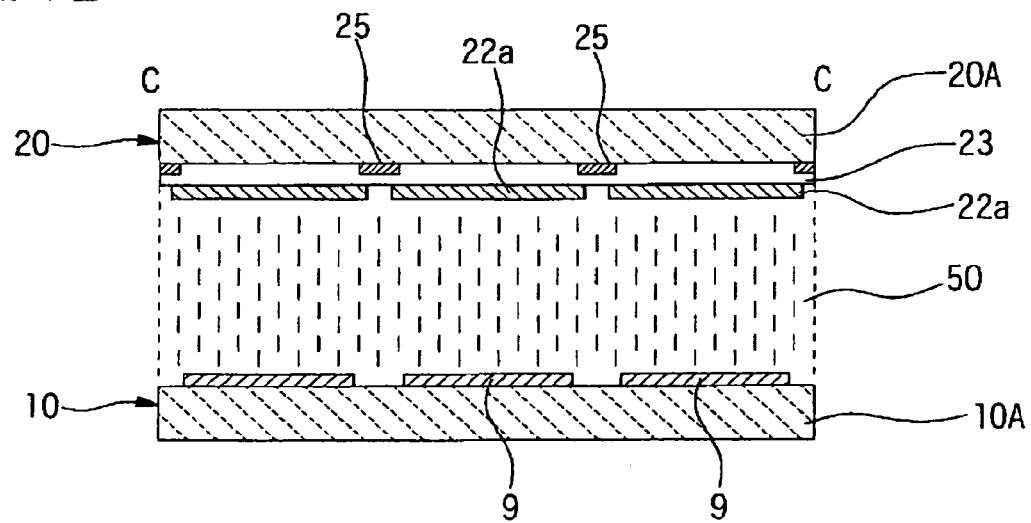
FIG. 7(B) is a partial cross-sectional view along plane C—C in FIG. 7(A)

A second exemplary embodiment of the present invention will now be described with reference to FIG. 7. FIG. 7(A) is a partial plan view showing a structure of a liquid crystal device according to the embodiment of the present invention. FIG. 7(B) is a cross-sectional view of the structure along plane C—C in FIG. 7(A).

In the liquid crystal device according to the exemplary embodiment, except for the structure of the counter substrate, the basic structure is the same as that in the liquid crystal device according to the first exemplary embodiment. Accordingly, the same reference numerals are used in FIG. 7 and FIGS. 1 to 3 to identify the same elements and their detailed descriptions are omitted.

With reference to FIGS. 7(A) and 7(B), in the liquid crystal device according to the exemplary embodiment, stripe alignment control electrodes 25 are formed on the inner surface of counter substrate 20. An insulating film 23 covers the inner surface of the counter substrate 20 including the alignment control electrodes 25, and stripe common electrodes 22a, which extend parallel to the alignment control electrodes 25, are formed on the insulating film 23. With reference to FIG. 7(A), the common electrodes 22a, which are made from a transparent conductive material, such as ITO, are disposed covering pixel electrodes 9 within their widths in plan view. The alignment control electrodes 25 are disposed between the edges of the pixel electrodes 9 with their long edges aligned to the transverse edges of the pixel electrodes 9 and overlap the scanning lines 3a in plan view. With reference to FIG. 7(B), the common electrodes 22a and the alignment control electrodes 25 are electrically insulated from each other by the insulating film 23. Like the first exemplary embodiment, driving circuits (not shown) are connected to the rectangular alignment control electrodes 25, to which the voltages of alternated polarities are applied. In the liquid crystal device according to this exemplary embodiment, the pixel electrodes 9 are also driven by the Row inversion mode.

As shown in FIG. 7(B), in the liquid crystal device according to the exemplary embodiment, although the alignment control electrodes 25 are positioned nearer to a substrate body 20A than the common electrodes 22a, electric fields generated by the alignment control electrodes 25 are hardly shielded by the common electrodes 22a. This is because the common electrodes 22a are formed in a stripe pattern and the areas corresponding to the alignment control electrodes 25 are open in plan view. The electric fields act on a liquid crystal layer 50 at the boundaries of the dot areas while being hardly shielded by the common electrodes 22a and can align the tilts of the liquid crystal molecules in the arrangement direction of the alignment control electrodes 25 (the longitudinal direction in FIG. 7(A)) when voltages are applied. As a result, the liquid crystal device according to the exemplary embodiment also suppresses the occurrence of the disclination and provides a bright display.

Figure 8:
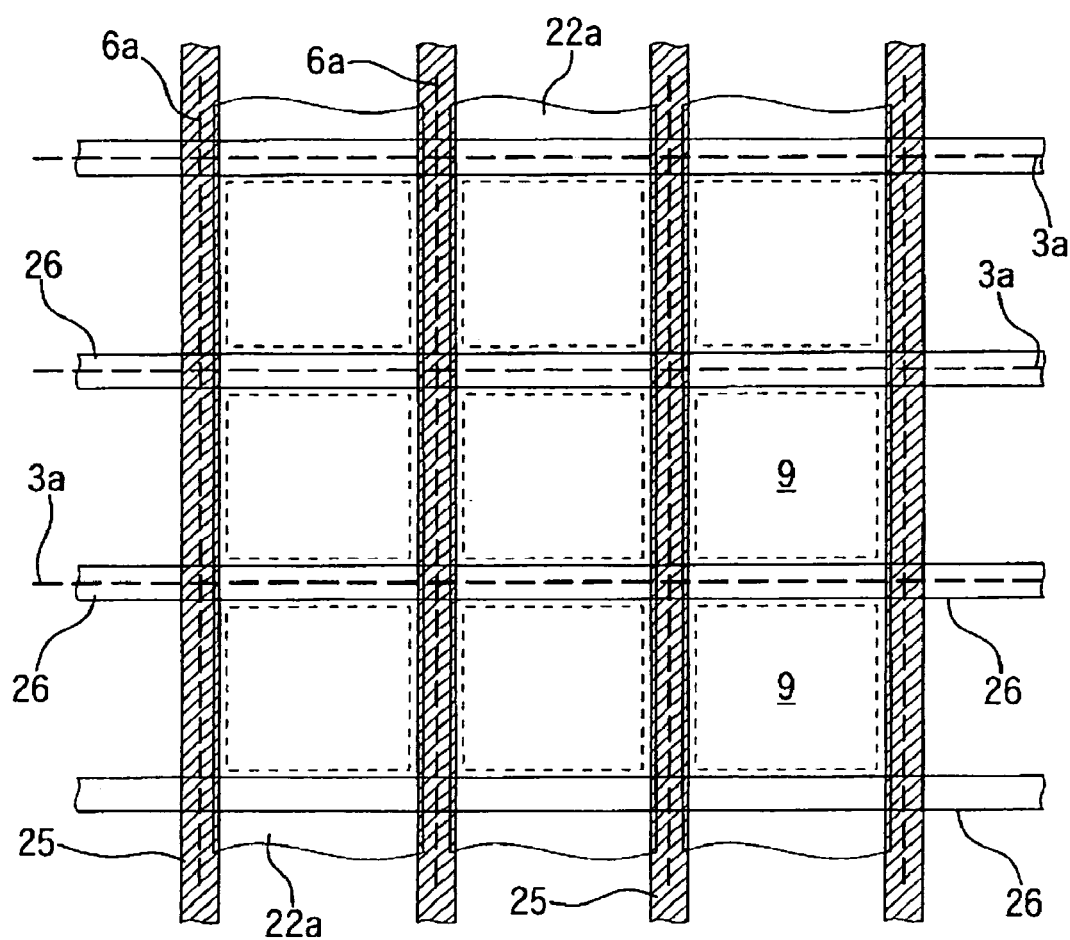
FIG. 8 is a plan view of another structure of the liquid crystal device according to the second exemplary embodiment.

Like the liquid crystal device according to the above-described exemplary embodiment, in the liquid crystal device according to this exemplary embodiment, the alignment control electrodes 25 may be disposed along the data lines 6a. FIG. 8 is a plan view of the structure of the liquid crystal device according to this exemplary embodiment. With reference to FIG. 8, the alignment control electrodes 25 are disposed along the data lines 6a, the stripe common electrodes 22a are formed along the data lines 6a, and the stripe light shielding films 26 are formed along the scanning lines 3a. In this structure, the liquid crystal device is driven by the Column inversion mode.

Electronic Apparatus

FIG. 9 is a perspective view of a mobile telephone, which is an example of the electronic apparatuses including a liquid crystal device according to an aspect of the present invention as a display unit. A mobile telephone 1300 has the liquid crystal device according to an aspect of the present invention as a compact display unit 1301, a plurality of operation buttons 1302, an earpiece 1303, and a mouthpiece 1304.

The liquid crystal device according to the above-described exemplary embodiments can be appropriately applied to projection light valves and direct view display devices, and the application is not limited to the mobile telephone.

For example, it can be appropriately applied to a projection display device, such as a liquid crystal display projector, electronic books, personal computers, digital still cameras, liquid crystal display TVs, view finder type or direct view CRT type video cassette recorders, car navigation systems, pagers, personal digital assistances, portable calculators, word processors, workstations, TV phones, point-of-sale (POS) terminals, and devices having touch-screens as display units of these devices, and can provide high-quality display for all such devices.

What is claimed is:

1. A liquid crystal device, comprising:
   an array substrate having pixel electrodes arranged in a matrix and switching elements corresponding to the respective pixel electrodes formed on a surface of the array substrate;
   a counter substrate opposing the array substrate;
   a liquid crystal layer including negative dielectric anisotropy liquid crystal disposed between the array substrate and the counter substrate; and
   stripe alignment control electrodes disposed between the counter substrate and the liquid crystal layer, each alignment control electrode extending along the boundaries of the pixel electrodes in plan view.

2. The liquid crystal device according to claim 1, the voltages applied to two adjacent alignment control electrodes having reverse polarities.

3. The liquid crystal device according to claim 1, the voltages applied to the alignment control electrodes being lower than the maximum driving voltage of the pixel electrodes.

4. The liquid crystal device according to claim 1, mutually orthogonal scanning lines and data lines extending along the edges of the pixel electrodes, the liquid crystal device being driven by a Row inversion mode, and the alignment control electrodes substantially overlapping the scanning lines in plan view.

5. The liquid crystal device according to claim 1, mutually orthogonal scanning lines and data lines extending along the edges of the pixel electrodes, the liquid crystal device being driven by a Column inversion mode, and the alignment control electrodes substantially overlapping the data lines in plan view.

6. The liquid crystal device according to claim 1, further comprising:
   a common electrode formed over the entire liquid-crystal-layer facing surface of the counter substrate;
   the alignment control electrodes being formed between the common electrode and the liquid crystal layer with an insulating layer between the common electrode and the alignment control electrodes.

7. The liquid crystal device according to claim 1, further comprising:
   common electrodes formed substantially in a stripe pattern between the counter substrate and the liquid crystal layer;
   the alignment control electrodes being formed between the common electrodes and the counter substrate with an insulating layer between the alignment control electrodes and the common electrodes and extending along gaps between the pixel electrodes in plan view.

8. The liquid crystal device according to claim 1, further comprising:
   common electrodes formed substantially in a stripe pattern between the counter substrate and the liquid crystal layer;
   the alignment control electrodes being formed in the gaps of the common electrodes and extending parallel to the common electrodes.

9. The liquid crystal device according to claim 1, the alignment control electrodes functioning as light shielding films or parts of light shielding films.

10. The liquid crystal device according to claim 1, further comprising: color filters formed between the alignment control electrodes and the counter substrate.

11. The liquid crystal device according to claim 1 further comprising:
    a circularly polarized light incident device disposed on both sides of the liquid crystal layer to enable circularly polarized light to enter the liquid crystal layer.

12. The liquid crystal device according to claim 1, the pixel electrodes being driven with voltages of reverse polarities applied to the adjacent alignment control electrodes.

13. The liquid crystal device according to claim 12, the voltages being applied to the alignment control electrodes in synchronization with the scanning of the pixel electrodes.

14. An electronic apparatus, comprising:
    the liquid crystal device according to claim 1.

* * * * *